US009848316B2

(12) United States Patent
Baek et al.

(10) Patent No.: US 9,848,316 B2
(45) Date of Patent: Dec. 19, 2017

(54) METHOD FOR PERFORMING D2D DISCOVERY AND TERMINAL USING SAME

(71) Applicant: Samsung Electronics Co., Ltd., Suwon-si (KR)

(72) Inventors: Sangkyu Baek, Suwon-si (KR); Seunghoon Park, Seoul (KR); Kyungkyu Kim, Suwon-si (KR); Hyunseok Ryu, Yongin-si (KR); Chiwoo Lim, Suwon-si (KR); Youngbin Chang, Anyang-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 36 days.

(21) Appl. No.: 14/904,306

(22) PCT Filed: Jul. 10, 2014

(86) PCT No.: PCT/KR2014/006207
§ 371 (c)(1),
(2) Date: Jan. 11, 2016

(87) PCT Pub. No.: WO2015/005699
PCT Pub. Date: Jan. 15, 2015

(65) Prior Publication Data
US 2016/0142899 A1    May 19, 2016

(30) Foreign Application Priority Data
Jul. 12, 2013    (KR) .................. 10-2013-0082368

(51) Int. Cl.
*H04W 8/00*    (2009.01)
*H04W 48/16*    (2009.01)
(Continued)

(52) U.S. Cl.
CPC ............. *H04W 8/005* (2013.01); *H04L 47/11* (2013.01); *H04W 48/16* (2013.01);
(Continued)

(58) Field of Classification Search
CPC ............... H04W 8/005; H04W 72/005; H04W 72/0446; H04W 76/023; H04W 48/16; H04L 47/11
See application file for complete search history.

(56) References Cited

U.S. PATENT DOCUMENTS 8,503,968 B2    8/2013    Singh et al.
8,755,302 B2    6/2014    Shao et al.
(Continued)

FOREIGN PATENT DOCUMENTS

KR    10-2006-0010018    2/2006
KR    10-2009-0110290    10/2009
(Continued)

OTHER PUBLICATIONS

International Search Report corresponding to International Patent Application No. PCT/KR2014/006207, dated Sep. 29, 2014.
(Continued)

*Primary Examiner* — Andrew Lai
*Assistant Examiner* — Harry H Kim
(74) *Attorney, Agent, or Firm* — McAndrews, Held & Malloy, Ltd.

(57) ABSTRACT

The present invention relates to a method for performing a D2D discovery and a terminal using the same. Particularly, the present invention relates to a method for performing a D2D discovery, which compares a congestion level of another discovery slot selected randomly or according to a preset pattern with a threshold or a congestion level of a current discovery slot and determines a discovery slot to transmit a discovery message and a transmission period of
(Continued)

the discovery message according to a result of the comparison, and a terminal using the same. The present invention relates to a method for performing a D2D discovery using discovery resources including a plurality of discovery slots, and a terminal performing the same, the method comprising the steps of: broadcasting a discovery message by using a first discovery slot; comparing a congestion level of a selected second discovery slot with a predetermined congestion level value; determining a discovery slot to broadcast the discovery message on the basis of a result of the comparison; and broadcasting the discovery message by using the determined discovery slot.

20 Claims, 11 Drawing Sheets

(51) Int. Cl.
- H04W 76/02 (2009.01)
- H04L 12/801 (2013.01)
- H04W 72/00 (2009.01)
- H04W 72/04 (2009.01)

(52) U.S. Cl.
CPC ..... *H04W 72/005* (2013.01); *H04W 72/0446* (2013.01); *H04W 76/023* (2013.01)

(56) References Cited

U.S. PATENT DOCUMENTS

| | | | |
|---|---|---|---|
| 2006/0293885 A1* | 12/2006 | Gournay | G10L 19/012 704/223 |
| 2008/0112334 A1 | 5/2008 | Laroia et al. | |
| 2012/0058794 A1* | 3/2012 | Valentine | H04W 48/10 455/513 |
| 2014/0056220 A1* | 2/2014 | Poitau | H04W 40/246 370/328 |
| 2014/0185529 A1 | 7/2014 | Lim et al. | |
| 2015/0043438 A1* | 2/2015 | Fwu | H04W 28/24 370/329 |

FOREIGN PATENT DOCUMENTS

| | | |
|---|---|---|
| KR | 10-2012-0100895 | 9/2012 |
| WO | 2013032251 | 3/2013 |

OTHER PUBLICATIONS

Lee, et al., "A Session Setup Mechanism Based on Selective Scanning to Improve Performance of Device-to-Device Communications", Korea Information and Communications Society, Conference Journal, Jun. 20, 2011 (English abstract only).

* cited by examiner

METHOD FOR PERFORMING D2D DISCOVERY AND TERMINAL USING SAME

RELATED APPLICATIONS

This application is a National Phase Entry of PCT International Application No. PCT/KR2014/006207 filed on Jul. 10, 2014, and claims priority to Korean Patent Application No. 10-2013-0082368 filed on Jul. 12, 2013, the contents of which are incorporated herein by reference.

BACKGROUND

The present disclosure relates to a method of performing a D2D discovery and a terminal using the method and, more particularly to, a D2D discovery performing method of comparing a congestion level of a discovery slot selected according to a predetermined or preset condition with a threshold or a congestion level of a current discovery slot and determining a discovery slot to transmit a discovery message and a transmission period of the discovery message according to a result of the comparison, and a method thereof.

According to the development of wireless communication technologies, a Device-to-Device Communication (hereinafter, referred to as D2D communication) technology in which adjacent terminals perform direct communication without the use of a cellular network is spotlighted.

The D2D communication largely includes a D2D discovery for discovering an adjacent terminal or an application program of the terminal and D2D direct communication in which terminals actually exchange data.

A wireless communication system supporting the D2D communication should allocate some or all of the wireless communication resources as discovery resources for the D2D discovery. D2D terminals broadcast discovery messages by using predetermined discovery slots among the allocated discovery resources through the wireless communication system. At this time, the terminals select predetermined discovery slots stochastically or according to a particular pattern and individually transmit the D2D discovery messages. Accordingly, as the number of terminals increases, a congestion level of limited discovery resources increases and collisions between discovery messages are frequently generated.

In order to minimize the loss, a method by which the terminal can select an efficient discovery slot, which is suitable for the discovery, is required.

In a CSMA/CA method corresponding to a random access method used for technologies such as IEEE 802.11 wireless LAN, IEEE 802.15 WPAN, and the like, when a transmission terminal transmits a packet but does not successfully receive an ACK packet of the corresponding packet, it is considered as a collision of the transmitted packet and the packet is retransmitted after a backoff for a predetermined time.

The CSMA/CA method is mainly used for one-to-one communication and is used when the ACK packet of the transmitted packet can be received. However, the D2D discovery does not guarantee the reception of the ACK packet, so that the CSMA/CA method cannot be used for selecting the discovery slot.

According to the conventional D2D discovery method, the terminal may continuously monitor discovery slots and then select a discovery slot having weak energy by a discovery signal of another terminal. When a discovery message collision is detected in the selected discovery slot, the terminal may select another discovery slot having weak energy and broadcast a discovery message.

However, in the conventional discovery slot selection methods, the terminal monitors neighboring discovery slots one by one and thus it is inefficient. Further, when the number of terminals using the network increases, the conventional discovery slot selection methods basically cannot control the congestion.

SUMMARY

The present invention has been made to solve the aforementioned problem and provides a D2D discovery performing method of comparing a congestion level of a discovery slot selected randomly or according to a preset condition with a threshold or a congestion level of a current discovery slot and determining a discovery slot to transmit a discovery message according to a result of the comparison, and a method thereof.

Further, the present invention has been made to solve the aforementioned problem and provides a D2D discovery performing method of comparing a congestion level of a current discovery slot with a congestion level of another discovery slot selected randomly or according to a preset condition and determining a transmission period of a discovery message according to a result of the comparison, and a method thereof.

A discovery performing method according to the present invention is a method of performing a D2D discovery using discovery resources including a plurality of discovery slots. The method includes: broadcasting a discovery message by using a first discovery slot; comparing a congestion level of a selected second discovery slot with a predetermined congestion level; determining a discovery slot to broadcast the discovery message based on a result of the comparison; and broadcasting the discovery message by using the determined discovery slot.

The predetermined congestion level may be one of a congestion level of the first discovery slot, a preset threshold, a minimum congestion level, and a maximum congestion level.

The determining of the discovery slot to broadcast the discovery message may include: when a congestion level of the first discovery slot is larger than a congestion level of the second discovery slot, determining the second discovery slot as the discovery slot to broadcast the discovery message; and when the congestion level of the first discovery slot is smaller than the congestion level of the second discovery slot, determining the first discovery slot as the discovery slot to broadcast the discovery message.

The determining of the discovery slot to broadcast the discovery message may include, when a congestion level of the second discovery slot is smaller than a preset threshold, determining the second discovery slot as the discovery slot to broadcast the discovery message.

The determining of the discovery slot to broadcast the discovery message may include, when a congestion level of the first discovery slot is smaller than a congestion level of the second discovery slot and when the congestion level of the first discovery slot is larger than a preset threshold, determining a randomly selected third discovery slot as the discovery slot to broadcast the discovery message.

The method may further include determining a transmission period of the discovery message based on the result of the comparison between the congestion levels.

The determining of the transmission period may include: when a congestion level of the first discovery slot is larger than a congestion level of the second discovery slot, reducing the transmission period; and when the congestion level of the first discovery slot is equal to or smaller than the congestion level of the second discovery slot, increasing the transmission period.

The determining of the transmission period may include: when a congestion level of the second discovery slot is equal to or smaller than a preset threshold, reducing the transmission period; and when the congestion level of the second discovery slot is larger than the preset threshold, increasing the transmission period.

The determining of the transmission period may include: when a congestion level of the determined discovery slot to broadcast the discovery message is smaller than a preset minimum threshold, reducing the transmission period; and when the congestion level of the determined discovery slot to broadcast the discovery message is larger than a preset maximum threshold, increasing the transmission period.

The second discovery slot may be selected within discovery resources including the first discovery slot.

A terminal according to the present invention is a terminal for performing a D2D discovery using discovery resources including a plurality of discovery slots. The terminal includes: a communication unit for broadcasting a discovery message; and a controller for controlling the communication unit to broadcast the discovery message by using a first discovery slot, comparing a congestion level of a selected second discovery slot with a predetermined congestion level, determining a discovery slot to broadcast the discovery message based on a result of the comparison, and controlling the communication unit to broadcast the discovery message by using the determined discovery slot.

The predetermined congestion level may be one of a congestion level of the first discovery slot, a preset threshold, a minimum congestion level, and a maximum congestion level.

The controller may determine the second discovery slot as the discovery slot to broadcast the discovery message when a congestion level of the first discovery slot is larger than a congestion level of the second discovery slot, and determine the first discovery slot as the discovery slot to broadcast the discovery message when the congestion level of the first discovery slot is smaller than the congestion level of the second discovery slot.

The controller may determine the second discovery slot as the discovery slot to broadcast the discovery message when a congestion level of the second discovery slot is smaller than a preset threshold.

The controller may determine a randomly selected third discovery slot as the discovery slot to broadcast the discovery message when a congestion level of the first discovery slot is smaller than a congestion level of the second discovery slot and when the congestion level of the first discovery slot is larger than a preset threshold.

The controller may determine a transmission period of the discovery message based on the result of the comparison between the congestion levels.

The controller may reduce the transmission period when a congestion level of the first discovery slot is larger than a congestion level of the second discovery slot, and increase the transmission period when the congestion level of the first discovery slot is equal to or smaller than the congestion level of the second discovery slot.

The controller may reduce the transmission period when a congestion level of the second discovery slot is equal to or smaller than a preset threshold, and increase the transmission period when the congestion level of the second discovery slot is larger than the preset threshold.

The controller may reduce the transmission period when a congestion level of the determined discovery slot to broadcast the discovery message is smaller than a preset minimum threshold, and increase the transmission period when the congestion level of the determined discovery slot to broadcast the discovery message is larger than a preset maximum threshold.

The second discovery slot may be selected within discovery resources including the first discovery slot.

A D2D discovery performing method according to the present invention and a method thereof can allow a terminal to efficiently select a D2D discovery slot, thereby controlling congestion of the discovery slot.

Further, a D2D discovery performing method according to the present invention and a method thereof can increase a high transmission rate of a discovery message by a D2D terminal and effectively control a congestion state in which a large number of terminals exist in a network.

DETAILED DESCRIPTION

Figure 1:
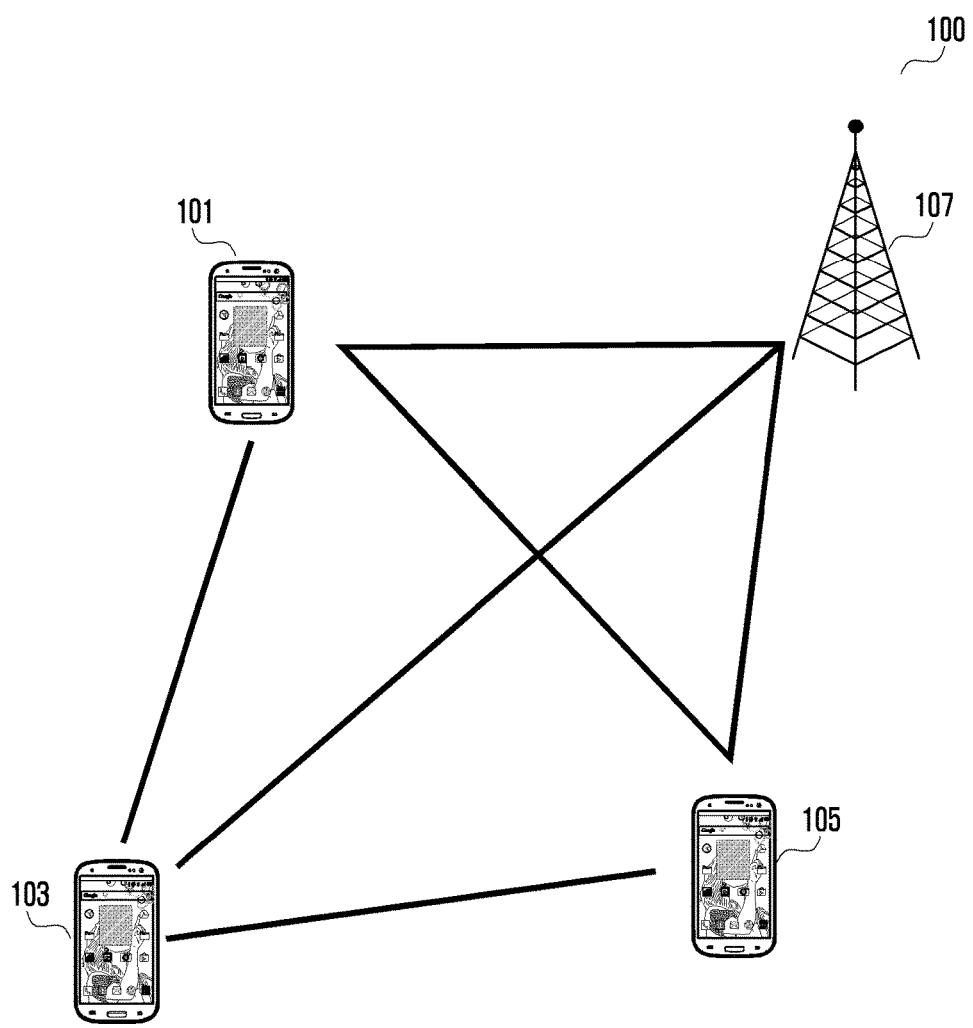
FIG. 1 illustrates a structure of a network to which a method of performing a discovery according to the present invention is applied.

The present invention may be applied to perform a D2D discovery by a terminal in a network supporting the D2D discovery or D2D communication.

Further, the present invention may be used for various wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), and the like. The terms "system" and "network" may be often interchangeably used with each other. The CDMA system may implement wireless technologies such as Universal Terrestrial Radio Access (UTRA), CDMA2000, and the like. UTRA includes Wideband-CDMA (W-CDMA) and other modified examples of the CDMA. CDMA2000 includes IS-2000, IS-95, and IS-856 standards. The TDMA system may implement a wireless technology such as a Global System for Mobile communication (GSM). The OFDM system may implement wireless technologies such as Evolved UTRA (E-UTRA), Ultra Mobile Broadband (UMB), IEEE 802.11 (Wi-Fi), IEEE 802.16 (WiMAX), IEEE 802.20, flash OFDM, and the like. UTRA and E-UTRA correspond to the part of a Universal Mobile Telephone System (UMTS). 3GPP LTE corresponds to the next release of UMTS that uses OFDMA in a downlink and uses SC-FDMA in an uplink. In addition, such wireless communication systems may further include peer-to-peer (for example, mobile-to-mobile) adhoc network systems that often use IEEE 802.11 WLAN, IEEE 802.15 WPAN, Bluetooth, and predetermined short-range or long-range wireless communication technologies.

Embodiments according to the present invention will be described in association with a terminal. The terminal may be called a system, a subscriber unit, a subscriber station, a mobile station, a mobile, a remote station, a remote terminal, a mobile device, a user terminal, a wireless communication device, a user agent, a user device, or a User Equipment (UE). The terminal may be a cellular phone, a Personal Digital Assistant (PDA), a handheld device having a radio access capability, a computing device, or another processing device connected to a wireless modem.

Discovery resources, which are the term used in the present invention, refer to radio resources allocated by the network to allow one or more terminals to use the resources for broadcasting discovery messages, and may be named a superframe or a frame in a time domain and a subcarrier, a subchannel, or the like in a frequency domain. According to various embodiments of the present invention, the discovery resources include a plurality of discovery slots, and the terminal selects a predetermined discovery slot and broadcasts a discovery message to adjacent terminals.

It should be noted that the technical terms in the specification are merely used for describing a specific embodiment but do not limit the scope of the present invention. Further, the technical terms in the specification should be construed as a meaning generally understood by those skilled in the art unless the terms are defined as another meaning and should not be construed as an excessively inclusive meaning or an excessively exclusive meaning.

In addition, a singular expression used in the specification includes a plural expression as long as they are clearly distinguished in the context. Throughout the specification, the terms such as "comprise" or "include" should not be construed as necessarily including all of the various component or steps described in the specification.

Hereinafter, embodiments of the present invention will be described in more detail with reference to the accompanying drawings.

The following embodiments use an example in which the terminal selects one discovery slot resource, but the present invention is not limited thereto. The same method may be applied to a case where, when the size of the discovery message is large, the terminal simultaneously selects two or more discovery slots to transmit the discovery message.

FIG. 1 illustrates a structure of a network to which a discovery performing method according to the present invention is applied.

Referring to FIG. 1, a network 100 to which the discovery performing method according to the present invention is applied may include one or more terminals 101, 103, and 105. The one or more terminals 103, 105, and 107 perform a D2D discovery process. In the discovery process, the one or more terminals 101, 103, and 105 broadcast a discovery message (or discovery signals) to inform adjacent terminals of their own information, and listen for adjacent signals to receive a discovery message transmitted from the adjacent terminals.

The one or more terminals 101, 103, and 105 may broadcast or listen for discovery messages by using discovery resources allocated from a sink node 107. According to various embodiments of the present invention, the sink node 107 may be one of a wireless AP, a base station of cellular communication, a PAN coordinator, and another terminal. The sink node 107 may allocate discovery resources including a plurality of discovery slots to allow the one or more terminals 101, 103, and 105 to use the allocated discovery resources when the discovery is performed. The discovery resources may correspond to a superframe in a time domain. The one or more terminals 101, 103, and 105 select predetermined discovery slots from the plurality of discovery slots included in the discovery resources, broadcast discovery messages, and listen for discovery messages through the discovery slots.

The one or more terminals 101, 103, and 105 may repeatedly broadcast and listen for the discovery messages on a predetermined period. The period on which the one or more terminals 101, 103, and 105 broadcast the discovery messages may be named a transmission period, a discovery period, or a discovery interval. According to an embodiment, the transmission period may mean a length of the discovery resources in the time domain.

When the one or more terminals 101, 103, and 105 receive responses to the discovery messages, which the one or more terminals 101, 103, and 105 have transmitted, from adjacent terminals or receive discovery messages from the adjacent terminals, the one or more terminals 101, 103, and 105 transmit responses to the discovery message to the adjacent terminals to establish connections for data communication with the adjacent terminals. When the connections are established, the one or more terminals 101, 103, and 105 perform D2D data communication with the adjacent terminals.

Figure 2:
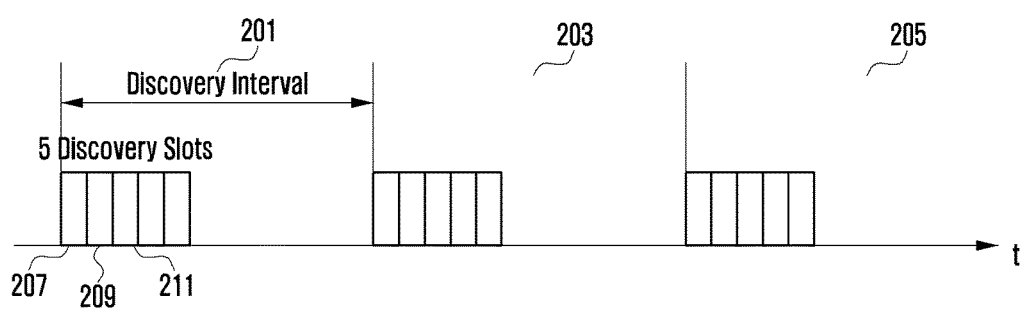
FIG. 2 illustrates a structure of discovery resources according to the present invention.

FIG. 2 illustrates a structure of discovery resources according to the present invention.

In the network illustrated in FIG. 1, the sink node 107 allocates wireless resources for the discovery of the one or more terminals 101, 103, and 105 that perform D2D communication. At this time, the wireless resources allocated for the discovery are referred to as discovery resources. According to an embodiment, the discovery resources may be named a superframe.

Referring to FIG. 2, each of discovery resources 201, 203, and 205 may include one or more discovery slots 207, 209, and 211. The one or more discovery slots 207, 209, and 211 may be included in entire or partial areas of the discovery resources 201, 203, and 205. That is, the one or more discovery slots 207, 209, and 211 may exist in an entirety or a part of the discovery interval. FIG. 2 illustrates an example in which the discovery slots 207, 209, and 211 exist in some of the discovery resources 201, 203, and 205, and five discovery slots 207, 209, and 211 are included in one discovery resource 201, 203, or 205.

The one or more terminals 101, 103, and 105 that perform the D2D communication may select one, two, or more discovery slots 207, 209, and 211 from the one or more discovery slots 207, 209, and 211 and transmit discovery messages.

According to various embodiments of the present invention, the one or more UEs 101, 103, and 105 may assign selection probabilities to the one or more discovery slots 207, 209, and 211 and select a predetermined discovery slot according to the assigned selection probability. At this time, the one or more terminals 101, 103, and 105 may assign the same selection probability to the one or more discovery slots 207, 209, and 211 or assign a weighted value to a selection probability of a particular discovery slot according to a previous communication record or a preset pattern.

Further, according to various embodiments of the present invention, one or more terminals 101, 103, and 105 may compare a congestion level of the currently used discovery slot and a congestion level of another discovery slot selected randomly or according to a preset condition and select a discovery slot to transmit a discovery message according to a result of the comparison.

According to various embodiments of the present invention, one or more terminals 101, 103, and 105 may transmit the discovery messages according to the transmission periods (discovery periods) of the discovery messages. The one or more terminals 101, 103, and 105 may control the transmission periods of the discovery messages according to the congestion level of the other discovery slot selected randomly or according to the preset condition. The one or more terminals 101, 103, and 105 may select the discovery slot that measures the congestion level randomly or according to a preset condition including at least one of a congestion level of the discovery slot, a received signal strength, a pre-selection frequency, a predefined discovery slot selection pattern.

The structure of the discovery resources according to the present invention may exist independently or coexist with conventional networks of a cellular network such as LTE or the like, a Wireless Local Area Network (WLAN), a Wireless Personal Area Network (WPAN), and the like. For example, in the LTE network, the base station may allocate discovery resources and a discovery period to a terminal through broadcast information such as a System Information Block (SIB) and the like, and the terminal may perform the discovery by using the discovery resources and the discovery period included in the broadcast information.

In the WLAN or WPAN, an AP or a PAN coordinator, which serves as the sink node, may insert a discovery resource discovery period into a beacon and transmit the beacon. Alternatively, the discovery resource discovery period may be a value pre-stored in the terminal.

Figure 3:
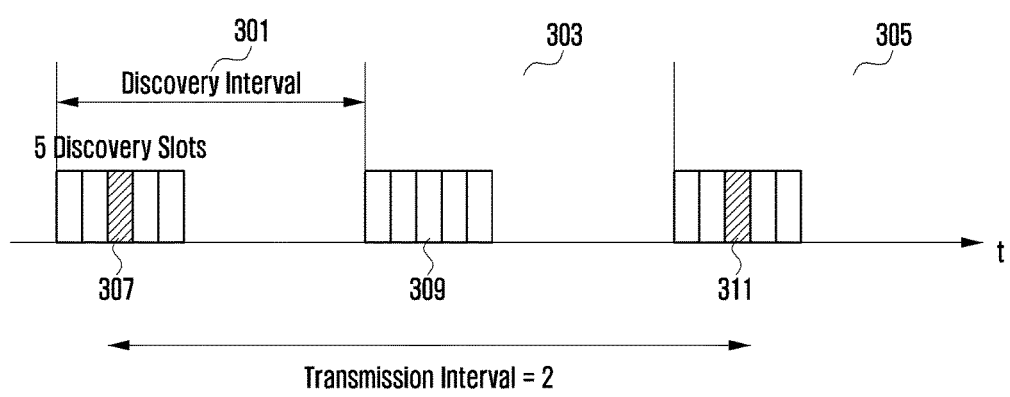
FIG. 3 illustrates an example for performing the discovery according to the present invention.

FIG. 3 illustrates an example for performing the discovery according to the present invention. More specifically, FIG. 3 illustrates an example in which the terminal transmits a discovery message according to a predetermined discovery period by using a predetermined discovery slot.

The terminal may assign selection probabilities to a plurality of discovery slots included in the discovery resources allocated for the D2D discovery and select a predetermined discovery slot according to the assigned selection probabilities. At this time, the terminal may assign the same selection probability to the one or more discovery slots 207, 2009, and 211 or assign a weighted value to a selection probability of a particular discovery slot according to a previous communication record or a preset pattern.

FIG. 3 illustrates an example in which the terminal broadcasts the discovery message by using a third discovery slot among five discovery slots included in the discovery resources.

Further, the terminal may select a transmission period on which the discovery message will be transmitted and repeatedly broadcast the discovery message on the transmission period. The terminal may select the transmission period of the discovery message according to a congestion state of the discovery resources. Alternatively, the terminal may transmit the discovery message according to a transmission period designated by the sink node.

FIG. 3 illustrates an example in which the discovery message is transmitted on a transmission period when the transmission period is 2. The terminal broadcasts the discovery message through a third transmission slot 307 of the transmission resources in a first transmission period 301, and does not broadcast the discovery message in a second transmission period 303. Thereafter, the terminal broadcasts the discovery message through a third transmission slot 311 in a third transmission period 305.

According to various embodiments of the present invention, the discovery slot and the transmission period may vary depending on a result of the monitoring of the congestion level of the transmission resources by the terminal. More specifically, the terminal monitors a congestion level of a discovery slot currently used for transmitting a discovery message at predetermined observation intervals. Further, the terminal monitors congestion states of adjacent terminals by observing congestion levels of other discovery slots selected randomly or according to a preset condition. At this time, a reference for determining the congestion level may use a result of measurement of an energy strength (received signal strength), a Bit Error Rate (BER), or the like. The terminal may determine whether to continuously use the current discovery slot or select again another discovery slot by repeatedly observing the congestion level at the observation interval. According to an embodiment, the transmission resources observed by the terminal may be transmission resources by which the terminal does not transmit the discovery message according to the discovery period.

Figure 4:
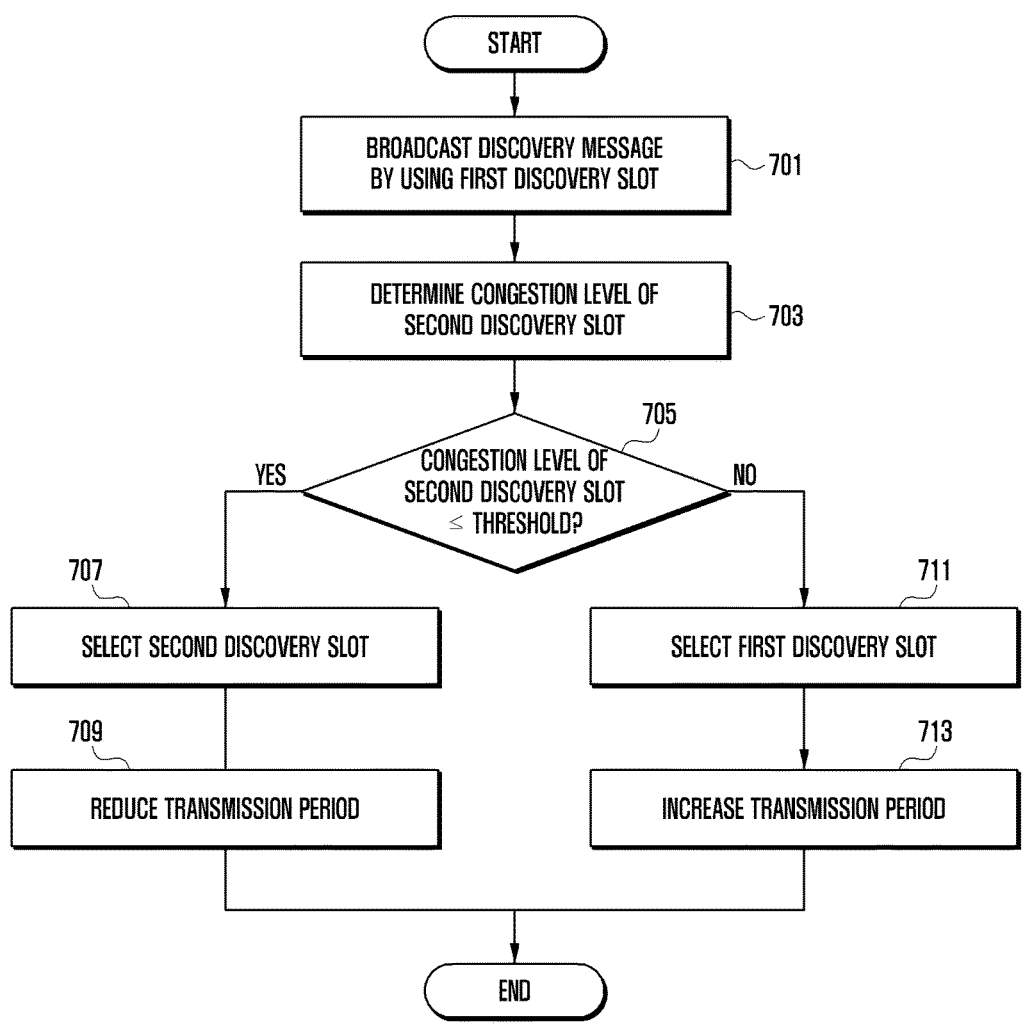
FIG. 4 is a flowchart illustrating a method of performing the discovery according to a first embodiment of the present disclosure.

FIG. 4 is a flowchart illustrating a method of performing the discovery according to a first embodiment of the present disclosure.

Referring to FIG. 4, the terminal broadcasts a discovery message by using a first discovery slot in step 701.

The first discovery slot may be a discovery slot allocated by a sink node at a start time point or a discovery slot randomly selected by the terminal. Further, the terminal may repeatedly transmit the discovery message according to a preset transmission period.

Next, the terminal determines a congestion level of a second discovery slot in step 703.

That is, according to an embodiment of the present invention, the terminal observes a congestion level of discovery resources. The observation may be repeatedly performed according to an observation period, and the observation period may be the same as or different from the discovery period.

The second discovery slot is selected by the terminal randomly or according to a preset condition, and may be selected from a plurality of discovery slots existing in the same discovery resources as those of the first discovery slot. That is, the second discovery slot is selected in the transmission resources including the first discovery slot.

The terminal may assign selection probability to one or more discovery slots included in the discovery resources and select the second discovery slot according to the assigned selection probabilities. At this time, the terminal may assign the same selection probability to the one or more discovery slots or assign a weighted value to a selection probability of a particular discovery slot according to a previous communication record or a preset pattern.

The terminal may select the second discovery slot from the plurality of discovery slots, and select the second discovery slot according to at least one piece of information among congestion levels, received signal strengths, pre-selection frequencies, and predefined selection patterns of the plurality of discovery slots.

When the second discovery slot is selected, the terminal determines a congestion level of the second discovery slot. As a reference for determining the congestion level, a result of measurement of an energy strength (received signal strength), a Bit Error Rate (BER), or the like may be used.

When the congestion level of the second discovery slot is determined, the terminal determines whether the congestion level of the second discovery slot is equal to or smaller than a preset threshold in step 705.

The threshold may be preset by a D2D service provider or a user. The threshold may be included in the SIB in a case of LTE and included in the beacon in a case of WLAN or WPAN. The threshold may refer to a minimum congestion level required when the terminal broadcasts the discovery message by using the corresponding discovery slot. That is, when the congestion level of the predetermined discovery slot is larger than the threshold, a collision may occur when the discovery message is transmitted through the corresponding discovery slot or the discovery message may not be normally transmitted to an adjacent terminal.

Accordingly, when the congestion level of the second discovery slot is equal to or smaller than the preset threshold, the terminal determines to transmit the discovery message by using the second discovery slot. That is, the terminal selects the second discovery slot as the discovery slot to transmit the discovery message in step 707.

At this time, the terminal may control a transmission period according to a result of the comparison between the second discovery slot and the threshold. According to an embodiment of the present invention, when the congestion level of the second discovery slot is equal to or smaller than the preset threshold, the terminal reduces the transmission period in step 709.

The terminal may reduce the transmission period according to various methods. For example, the terminal may linearly reduce the transmission period (−1, −2, . . . ) or exponentially reduce the transmission period. Alternatively, the terminal may reduce the transmission period according to a predetermined progression or pattern. In order to calculate the reduction pattern, various methods, including a method of calculating an integer value approximate to a square root, a log value, or an exponential multiple of a current transmission period (through rounding, rounding-off, or rounding up) or an approximate integer difference thereof, may be used. In this case, the terminal cannot reduce the transmission period to be a value smaller than a minimum value of the transmission period. According to an embodiment, when it is detected that the congestion level is continuously low a predetermined number of times, the terminal may configure a predetermined value as the transmission period.

In contrast, when the congestion level of the second discovery slot is larger than the preset threshold, the terminal does not change the discovery slot. That is, the terminal selects the currently used discovery slot, that is, the first discovery slot as the discovery slot to transmit the discovery message in step 711.

According to an embodiment of the present invention, when the congestion level of the second discovery slot is larger than the preset threshold, the terminal increases the transmission period in step 713.

According to an embodiment of the present invention, the terminal may increase the transmission period according to various methods. For example, the terminal may linearly increase the transmission period (+1, +2, . . . ) or exponentially increase the transmission period. Alternatively, the terminal may increase the transmission period according to a predetermined progression or pattern. In order to calculate the increase pattern, various methods, including a method of calculating an integer value approximate to a square root, a log value, or an exponential multiple of a current transmission period (through rounding, rounding-off, or rounding up) or an approximate integer difference thereof, may be used. In this case, the terminal cannot increase the transmission period to be a value larger than a maximum value of the transmission period.

Figure 5:
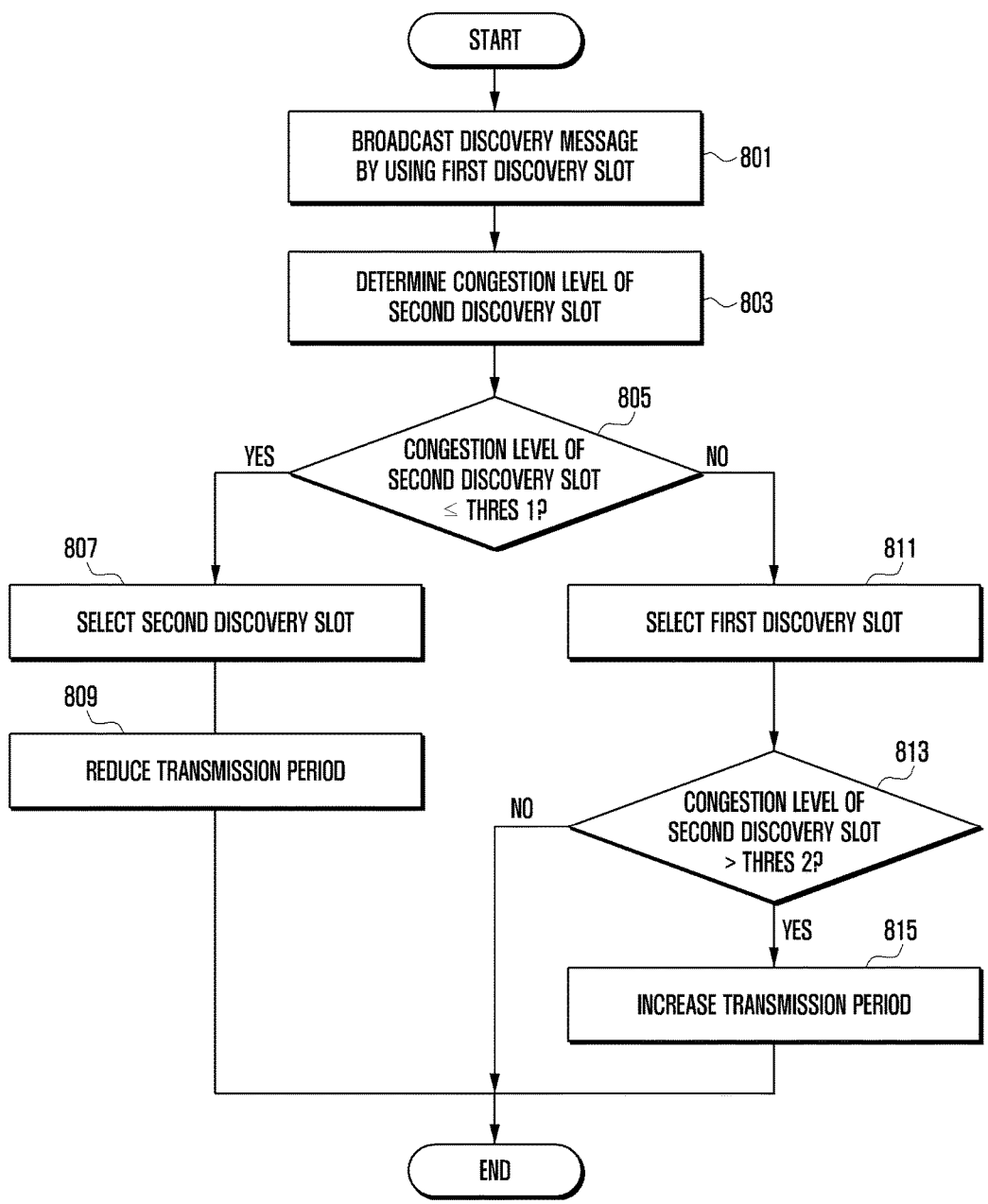
FIG. 5 is a flowchart illustrating a method of performing the discovery according to a second embodiment of the present disclosure.

FIG. 5 is a flowchart illustrating a method of performing the discovery according to a second embodiment of the present disclosure.

Referring to FIG. 5, the terminal broadcasts a discovery message by using a first discovery slot in step 801.

The first discovery slot may be a discovery slot allocated by a sink node or a discovery slot randomly selected by the terminal. Further, the terminal may repeatedly transmit the discovery message according to a preset transmission period.

Next, the terminal determines a congestion level of a second discovery slot in step 803.

That is, according to an embodiment of the present invention, the terminal observes a congestion level of discovery resources. The observation may be repeatedly performed according to an observation period, and the observation period may be the same as or different from the discovery period.

The second discovery slot is selected by the terminal randomly or according to a preset condition, and may be selected from a plurality of discovery slots existing in the same discovery resources as those of the first discovery slot. The second discovery slot may be selected from the remaining discovery slots except for the first discovery slot.

The terminal may assign selection probability to one or more discovery slots included in the discovery resources and select the second discovery slot according to the assigned selection probabilities. At this time, the terminal may assign the same selection probability to the one or more discovery slots or assign a weighted value to a selection probability of a particular discovery slot according to a previous communication record or a preset pattern.

The terminal may select the second discovery slot from the plurality of discovery slots and, at this time, select the second discovery slot according to at least one piece of information among congestion levels, received signal strengths, pre-selection frequencies, and predefined selection patterns of the plurality of discovery slots.

When the second discovery slot is selected, the terminal determines a congestion level of the second discovery slot. As a reference for determining the congestion level, a result of measurement of an energy strength (received signal strength), a Bit Error Rate (BER), or the like may be used.

The congestion level is higher as the number of terminals which transmit the discovery messages by using the corresponding discovery slot is larger. In contrast, the congestion level is lower as the number of terminals which transmit the discovery messages by using the corresponding discovery slot is smaller.

When the congestion level of the second discovery slot is determined, the terminal determines whether the congestion level of the second discovery slot is equal to or smaller than a preset first threshold in step 805.

The first threshold may be preset by a network, a D2D service provider, or a user. The first threshold may correspond to a minimum value of the congestion level and may refer to a minimum congestion level required when the terminal broadcasts the discovery message by using the corresponding discovery slot. That is, when the congestion level of the predetermined discovery slot is smaller than the minimum threshold, a collision may not occur when the discovery message is transmitted through the corresponding discovery slot or the terminal may correctly transmit the discovery message to an adjacent terminal.

Accordingly, when the congestion level of the second discovery slot is equal to or smaller than the first threshold, the terminal selects the second discovery slot in step 807.

Further, when the congestion level of the second discovery slot is equal to or smaller than the first threshold, the terminal may reduce the transmission period of the discovery message in step 809.

The terminal may decrease the transmission period according to various methods. For example, the terminal may linearly reduce the transmission period (−1, −2, . . . ) or exponentially reduce the transmission period. Alternatively, the terminal may reduce the transmission period according to a predetermined progression or pattern. In order to calculate the reduction pattern, various methods, including a method of calculating an integer value approximate to a square root, a log value, or an exponential multiple of a current transmission period (through rounding, rounding-off, or rounding up) or an approximate integer difference thereof, may be used. In this case, the terminal cannot reduce the transmission period to be a value smaller than a minimum value of the transmission period. According to an embodiment, when it is detected that the congestion level is continuously low a predetermined number of times, the terminal may configure a predetermined value as the transmission period.

When the congestion level of the second discovery slot is larger than the first threshold, the terminal does not change the discovery slot. That is, the terminal selects the currently used discovery slot, that is, the first discovery slot as the discovery slot to transmit the discovery message in step 811.

Further, the terminal determines whether the congestion level of the second discovery slot is larger than a second threshold in step 813.

The second threshold may be preset by a network, a D2D service provider, or a user. The second threshold may correspond to a maximum value of the congestion level and may refer to a maximum congestion level that allows the terminal to broadcast the discovery message by using the corresponding discovery slot. That is, when the congestion level of the predetermined discovery slot is larger than the maximum threshold, a serious collision may occur when the discovery message is transmitted through the corresponding discovery slot or a loss of the message is large, so that the terminal may not correctly transmit the discovery message.

Accordingly, when the congestion level of the second discovery slot is larger than the second threshold, the terminal may increase the transmission period in order to reduce the congestion level of the discovery resources in step 815.

According to an embodiment of the present invention, the terminal may increase the transmission period according to various methods. For example, the terminal may linearly increase the transmission period (+1, +2, . . . ) or exponentially increase the transmission period. Alternatively, the terminal may increase the transmission period according to a predetermined progression or pattern. In order to calculate the increase pattern, various methods, including a method of calculating an integer value approximate to a square root, a log value, or an exponential multiple of a current transmission period (through rounding, rounding-off, or rounding up) or an approximate integer difference thereof, may be used. In this case, the terminal cannot increase the transmission period to be a value larger than a maximum value of the transmission period.

Figure 6:
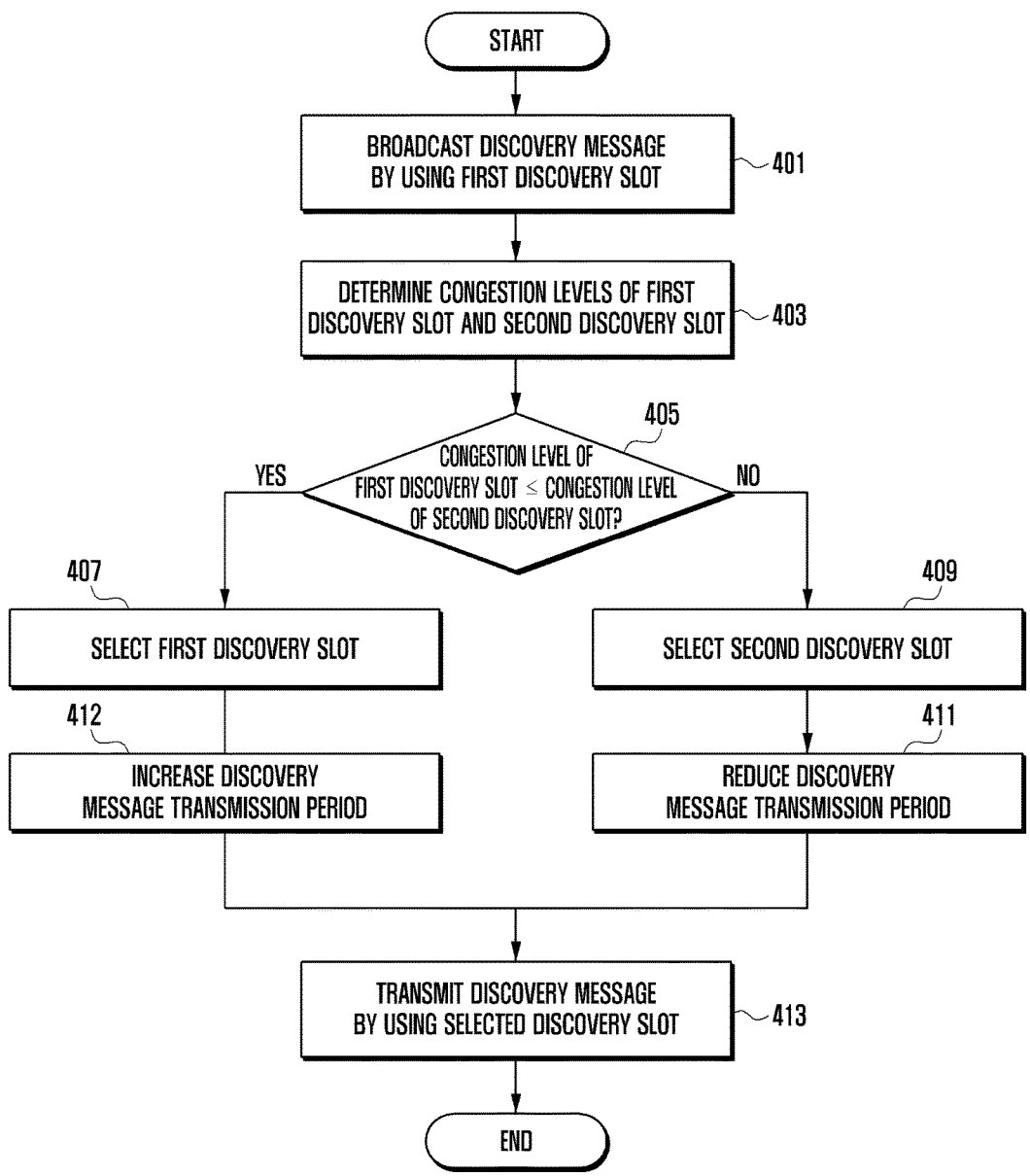
FIG. 6 is a flowchart illustrating a method of performing the discovery according to a third embodiment of the present disclosure.

FIG. 6 is a flowchart illustrating a method of performing the discovery according to a third embodiment of the present disclosure.

Referring to FIG. 6, the terminal broadcasts a discovery message by using a first discovery slot in step 401.

Figure 7:
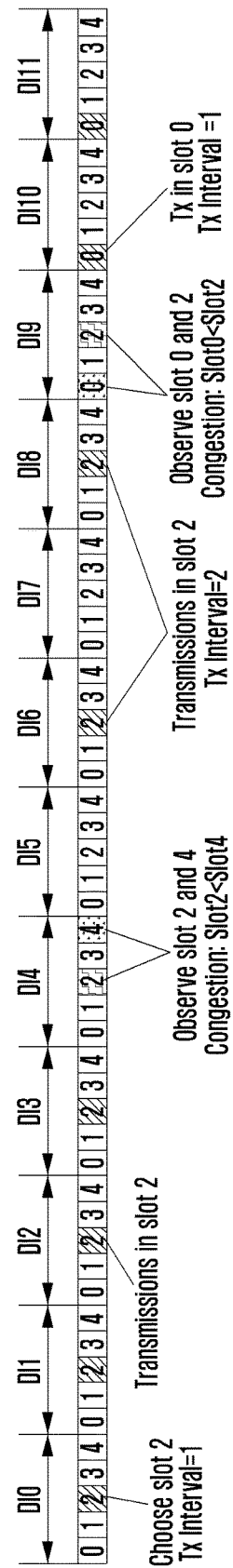
FIG. 7 illustrates an example for performing the discovery according to the third embodiment of the present invention.

The first discovery slot may be a discovery slot allocated by a sink node or a discovery slot randomly selected by the terminal. In the embodiment of FIG. 7, one discovery interval may include five discovery slots. The discovery slots may be numbered from 0 to 4. Further, in the embodiment of FIG. 7, the terminal broadcasts the discovery message by using a third discovery slot of the five discovery slots, that is, discovery slot 2. The terminal may select the transmission period of the discovery message to be 1 and repeatedly broadcast the discovery message once every transmission period for the two transmission periods.

Referring to FIG. 7, in each of the first transmission periods DI0, DI1, and DI2, the terminal transmits the discovery messages by using discovery slot 2.

Next, the terminal determines congestion levels of the first discovery slot and the second discovery slot in step 403.

That is, according to an embodiment of the present invention, the terminal observes congestion levels of the discovery resources. The observation may be repeatedly performed according to an observation period, and the observation period may be the same as or different from the discovery period. FIG. 7 illustrates an example in which the terminal performs the discovery according to the discovery period and then performs the observation in a predetermined discovery period.

The second discovery slot is selected by the terminal randomly or according to a preset condition, and may be selected from a plurality of discovery slots existing in the same discovery resources as those of the first discovery slot. That is, the second discovery slot is selected in the transmission resources including the first discovery slot.

The terminal may assign selection probability to one or more discovery slots included in the discovery resources and select the second discovery slot according to the assigned selection probabilities. At this time, the terminal may assign the same selection probability to the one or more discovery slots or assign a weighted value to a selection probability of a particular discovery slot according to a previous communication record or a preset pattern.

The terminal may select the second discovery slot from the plurality of discovery slots and, at this time, select the second discovery slot according to at least one piece of information among congestion levels, received signal strengths, pre-selection frequencies, and predefined selection patterns of the plurality of discovery slots. When the second discovery slot is selected, the terminal determines congestion levels of the first discovery slot and the second discovery slot. As a reference for determining the congestion level, a result of measurement of an energy strength (received signal strength), a Bit Error Rate (BER), or the like may be used.

The congestion level is higher as the number of terminals which transmit the discovery messages by using the corresponding discovery slot is larger. In contrast, the congestion level is lower as the number of terminals which transmit the discovery messages by using the corresponding discovery slot is smaller.

When the congestion levels of the first discovery slot and the second discovery slot are determined, the terminal compares the congestion levels of the first discovery slot and the second discovery slot. More specifically, the terminal determines whether the congestion level of the first discovery slot is equal to or smaller than the congestion level of the second discovery slot in step 405.

That is, the terminal determines whether the currently used first discovery slot has a better channel environment for the transmission of the discovery message compared to the second discovery slot selected randomly or according to the preset condition.

The terminal may select a discovery slot to transmit the discovery message later according to a result of the comparison. More specifically, when the congestion level of the first discovery slot is equal to or smaller than the congestion level of the second discovery slot, it means that the discovery slot, which the terminal currently uses, is not congested, so that the terminal selects the first discovery slot as the discovery slot to broadcast the discovery message in step 407.

Referring to FIG. 7, in discovery period DI4, the terminal selects discovery slot 4 as the second discovery slot. When a congestion level of discovery slot 2 is smaller than a congestion level of discovery slot 4, the terminal broadcasts the discovery message by using discovery slot 2 in the following discovery period in step 413.

In contrast, when the congestion level of the first discovery slot is not equal to or not smaller than the congestion level of the second discovery slot, the terminal selects the second discovery slot, which is less congested than the currently used discovery slot, as the discovery slot to broadcast the discovery message in step 409.

Referring to FIG. 7, in discovery period DI9, the terminal selects discovery slot 0 as the second discovery slot. When a congestion level of discovery slot 2 is larger than a congestion level of discovery slot 0, the terminal broadcasts the discovery message by using discovery slot 0 in the following discovery period in step 413.

According to an embodiment of the present invention, the terminal may control the transmission period (discovery period) of the discovery message based on a result of the comparison between the congestion levels. More specifically, when the congestion level of the first discovery slot is equal to or smaller than the congestion level of the second discovery slot based on a result of the comparison between the congestion levels, the terminal increases the transmission period in step 412. In contrast, when the congestion level of the first discovery slot is larger than the congestion level of the second discovery slot based on a result of the comparison between the congestion levels, it means that the congestion state of the discovery resources becomes better, the terminal decreases the transmission period in step 411.

According to an embodiment of the present invention, the terminal may increase the transmission period according to various methods. For example, the terminal may linearly increase the transmission period (+1, +2, . . . ) or exponentially increase the transmission period. Alternatively, the terminal may increase the transmission period according to a predetermined progression or pattern. In order to calculate the increase pattern, various methods, including a method of calculating an integer value approximate to a square root, a log value, or an exponential multiple of a current transmission period (through rounding, rounding-off, or rounding up) or an approximate integer difference thereof, may be used. In this case, the terminal cannot increase the transmission period to be a value larger than a maximum value of the transmission period.

According to an embodiment of the present invention, the terminal may reduce the transmission period according to various methods. For example, the terminal may linearly reduce the transmission period (−1, −2, . . . ) or exponentially reduce the transmission period. Alternatively, the terminal may reduce the transmission period according to a predetermined progression or pattern. In order to calculate the reduction pattern, various methods, including a method of calculating an integer value approximate to a square root, a log value, or an exponential multiple of a current transmission period (through rounding, rounding-off, or rounding up) or an approximate integer difference thereof, may be used. In this case, the terminal cannot reduce the transmission period to be a value smaller than a minimum value of the transmission period. According to an embodiment, when it is detected that the congestion level is continuously low a predetermined number of times, the terminal may configure a predetermined value as the transmission period.

Referring to FIG. 7, since the congestion level of discovery slot 2 is smaller than the congestion level of discovery slot 4 in discovery period DI4, the terminal linearly increases the transmission period by +1. In contrast, since the congestion level of discovery slot 2 is larger than the congestion level of discovery slot 0 in discovery period DI9, the terminal linearly reduces the transmission period by −1.

According to an embodiment of the present invention, when it is detected that the congestion level is continuously low a predetermined number of times, the terminal may select the discovery slot based on a predetermined value.

Figure 8:
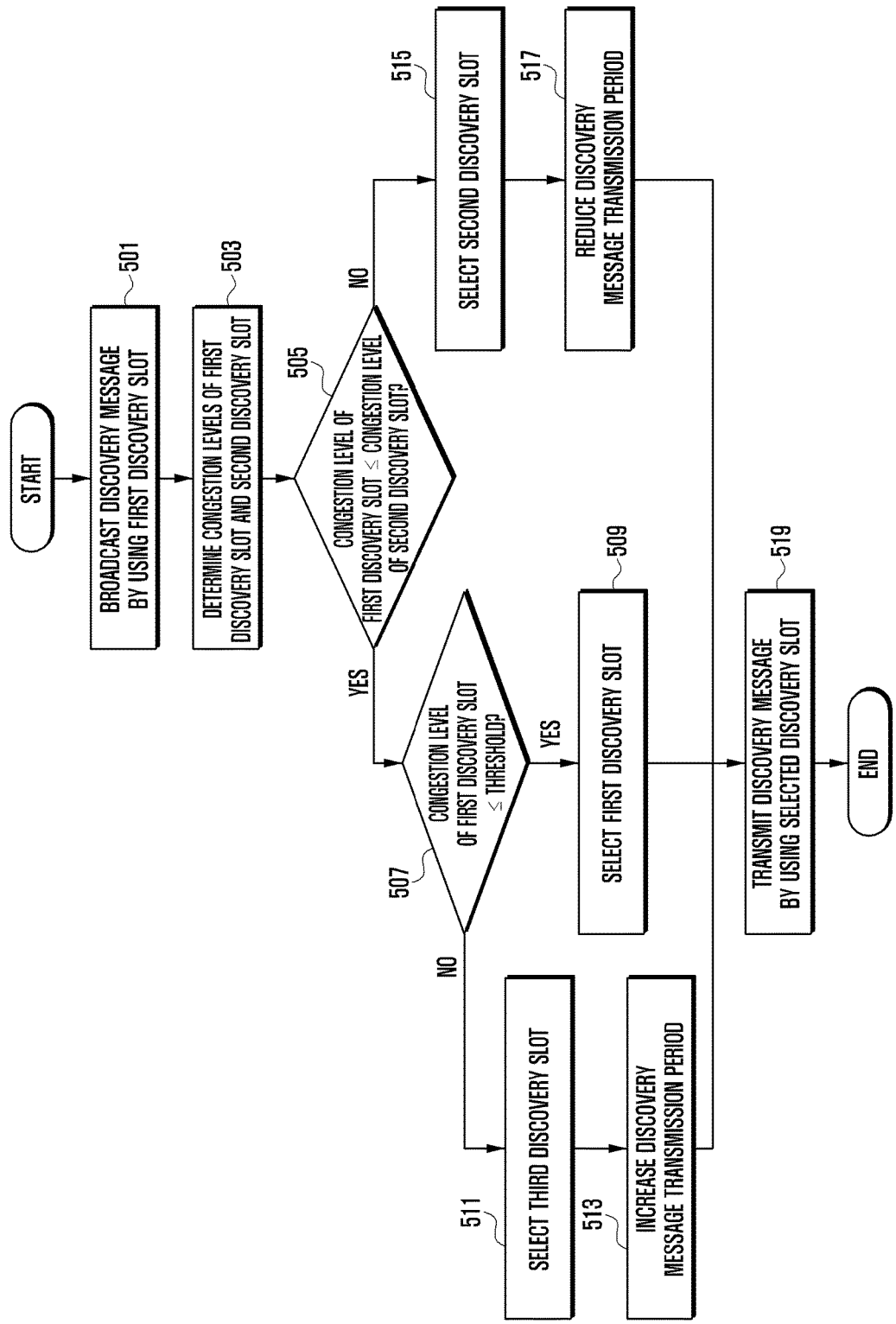
FIG. 8 is a flowchart illustrating a method of performing the discovery according to a fourth embodiment of the present disclosure.

FIG. 8 is a flowchart illustrating a method of performing the discovery according to a fourth embodiment of the present disclosure.

Referring to FIG. 8, the terminal broadcasts a discovery message by using a first discovery slot in step 501.

Figure 9:
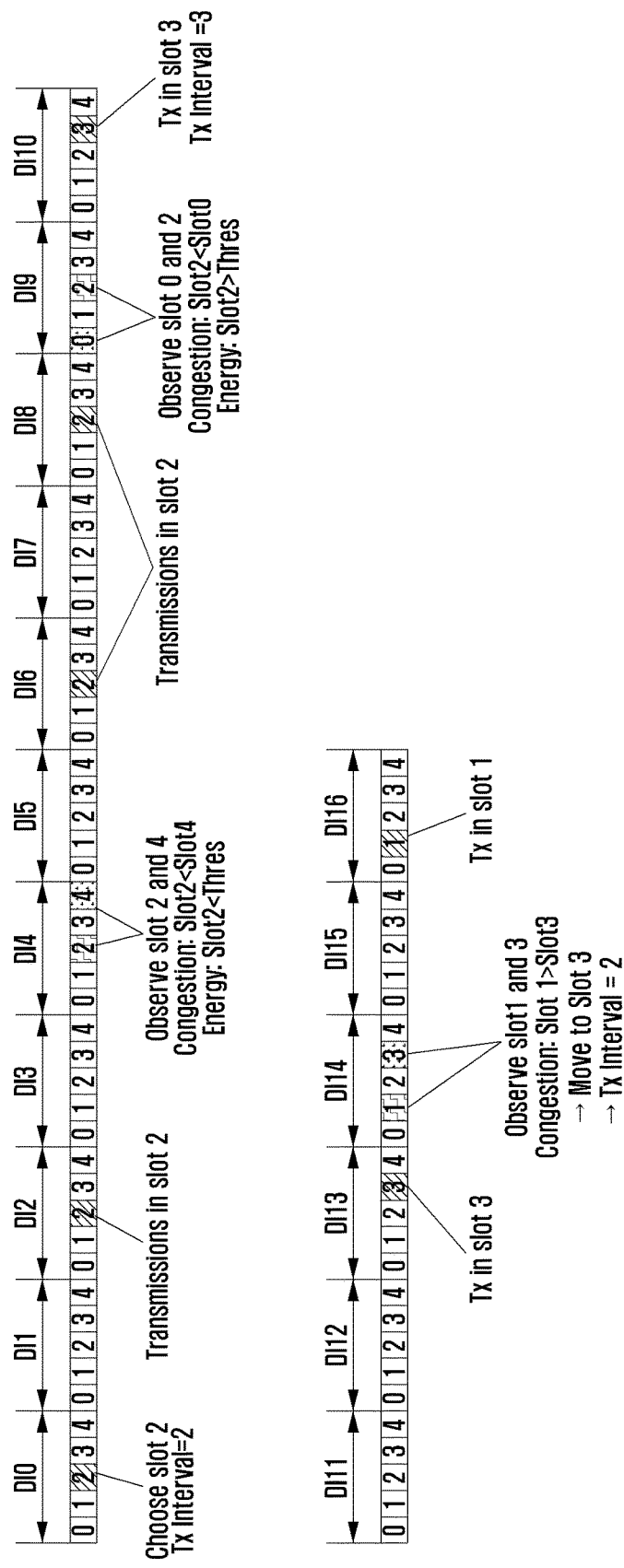
FIG. 9 illustrates an example for performing the discovery according to the fourth embodiment of the present invention.

Referring to FIG. 9, in first transmission period DI0, the terminal transmits the discovery messages by using discovery slot 2. Thereafter, the terminal transmits the discovery message by using discovery slot 2 in third transmission period DI2 according to the transmission period.

Next, the terminal determines congestion levels of the first discovery slot and the second discovery slot in step 503.

The terminal observes congestion levels of the discovery resources. The second discovery slot is selected by the terminal randomly or according to a preset condition, and may be selected from a plurality of discovery slots existing in the same discovery resources as those of the first discovery slot. That is, the second discovery slot is selected in the transmission resources including the first discovery slot.

When the second discovery slot is selected, the terminal determines congestion levels of the first discovery slot and the second discovery slot. As a reference for determining the congestion level, a result of measurement of an energy strength (received signal strength), a Bit Error Rate (BER), or the like may be used.

When the congestion levels of the first discovery slot and the second discovery slot are determined, the terminal compares the congestion levels of the first discovery slot and the second discovery slot. More specifically, the terminal determines whether the congestion level of the first discovery slot is equal to or smaller than the congestion level of the second discovery slot in step 505.

When the congestion level of the first discovery slot is equal to or smaller than the congestion level of the second discovery slot, the terminal determines whether the congestion level of the first discovery slot is equal to or smaller than a preset threshold in step 507.

The threshold may be preset by a D2D service provider or a user. The threshold may be included in the SIB in a case of LTE and included in the beacon in a case of WLAN or WPAN. The threshold may refer to a minimum congestion level required when the terminal broadcasts the discovery message by using the corresponding discovery slot. That is, when the congestion level of the predetermined discovery slot is larger than the threshold, a collision may occur when the discovery message is transmitted through the corresponding discovery slot or the discovery message may not be normally transmitted to an adjacent terminal.

Accordingly, when the congestion level of the first discovery slot is equal to or smaller than the preset threshold, the terminal determines that the first discovery slot has no problem to transmit the discovery message. That is, the terminal selects the first discovery slot as the discovery slot to transmit the discovery message in step 511.

Referring to FIG. 9, in discovery period DI4, the terminal selects discovery slot 4 as the second discovery slot. Since a congestion level of discovery slot 2 is smaller than a congestion level of discovery slot 4 and a threshold, the terminal broadcasts the discovery message by using discovery slot 2 in the following discovery period in step 519.

When the congestion level of the first discovery slot is larger than the preset threshold, the terminal selects a third discovery slot as the discovery slot to transmit the discovery message. The terminal may select a predetermined third discovery slot, and the third discovery slot is selected within the transmission resources including the first discovery slot. The terminal may assign selection probability to one or more discovery slots included in the discovery resources and select the third discovery slot according to the assigned selection probabilities. At this time, the terminal may assign the same selection probability to the one or more discovery slots or assign a weighted value to a selection probability of a particular discovery slot according to a previous communication record or a preset pattern.

Referring to FIG. 9, in discovery period DI9, the terminal selects discovery slot 0 as the second discovery slot. Since the congestion level of discovery slot 2 is smaller than the congestion level of discovery slot 0 but is larger than the threshold, the terminal selects the randomly selected third discovery slot as the discovery message to transmit the discovery message. In the following discovery period, the terminal broadcasts the discovery message by using discovery slot 3 in step 519.

When the congestion level of the first discovery slot is not equal to or not smaller than the congestion level of the second discovery slot, the terminal selects the second discovery slot, which is less congested than the currently used discovery slot, as the discovery slot to broadcast the discovery message in step 515.

Referring to FIG. 9, in discovery period DI14, the terminal selects discovery slot 1 as the second discovery slot. When a congestion level of discovery slot 3 is larger than a congestion level of discovery slot 1, the terminal broadcasts the discovery message by using discovery slot 1 in the following discovery period in step 519.

According to an embodiment of the present invention, the terminal may control the transmission period (discovery period) of the discovery message based on a result of the comparison between the congestion levels. More specifically, when the congestion level of the first discovery slot is equal to or smaller than the congestion level of the second discovery slot based on a result of the comparison between the congestion levels and when the congestion level of the first discovery slot is smaller than the threshold, the terminal does not change the transmission period. In contrast, when the congestion level of the first discovery slot is equal to or smaller than the congestion level of the second discovery slot and when the congestion level of the first discover slot is larger than the threshold, the terminal increases the transmission period while selecting the third discovery slot in step 513.

According to an embodiment of the present invention, the terminal may increase the transmission period according to various methods. For example, the terminal may linearly increase the transmission period (+1, +2, . . . ) or exponentially increase the transmission period. Alternatively, the terminal may increase the transmission period according to a predetermined progression or pattern. In order to calculate the reduction pattern, various methods, including a method of calculating an integer value approximate to a square root, a log value, or an exponential multiple of a current transmission period (through rounding, rounding-off, or rounding up) or an approximate integer difference thereof, may be used. In this case, the terminal cannot increase the transmission period to be a value larger than a maximum value of the transmission period.

Referring to FIG. 9, since the congestion level of discovery slot 2 is smaller than the congestion level of discovery slot 4 in discovery period DI4, the terminal does not change the transmission period. In contrast, since the congestion level of discovery slot 2 is smaller than the congestion level of discovery slot 0 and larger than the threshold in discovery period DI9, the terminal linearly increases the transmission period by +1. Accordingly, the terminal may broadcast the discovery message by using discovery slot 3 randomly selected on the transmission period of 3 later.

Further, since the congestion level of discovery slot 3 is larger than the congestion level of discovery slot 1 in discovery period DI14, the terminal linearly reduces the transmission period by −1 in step 517.

Figure 10:
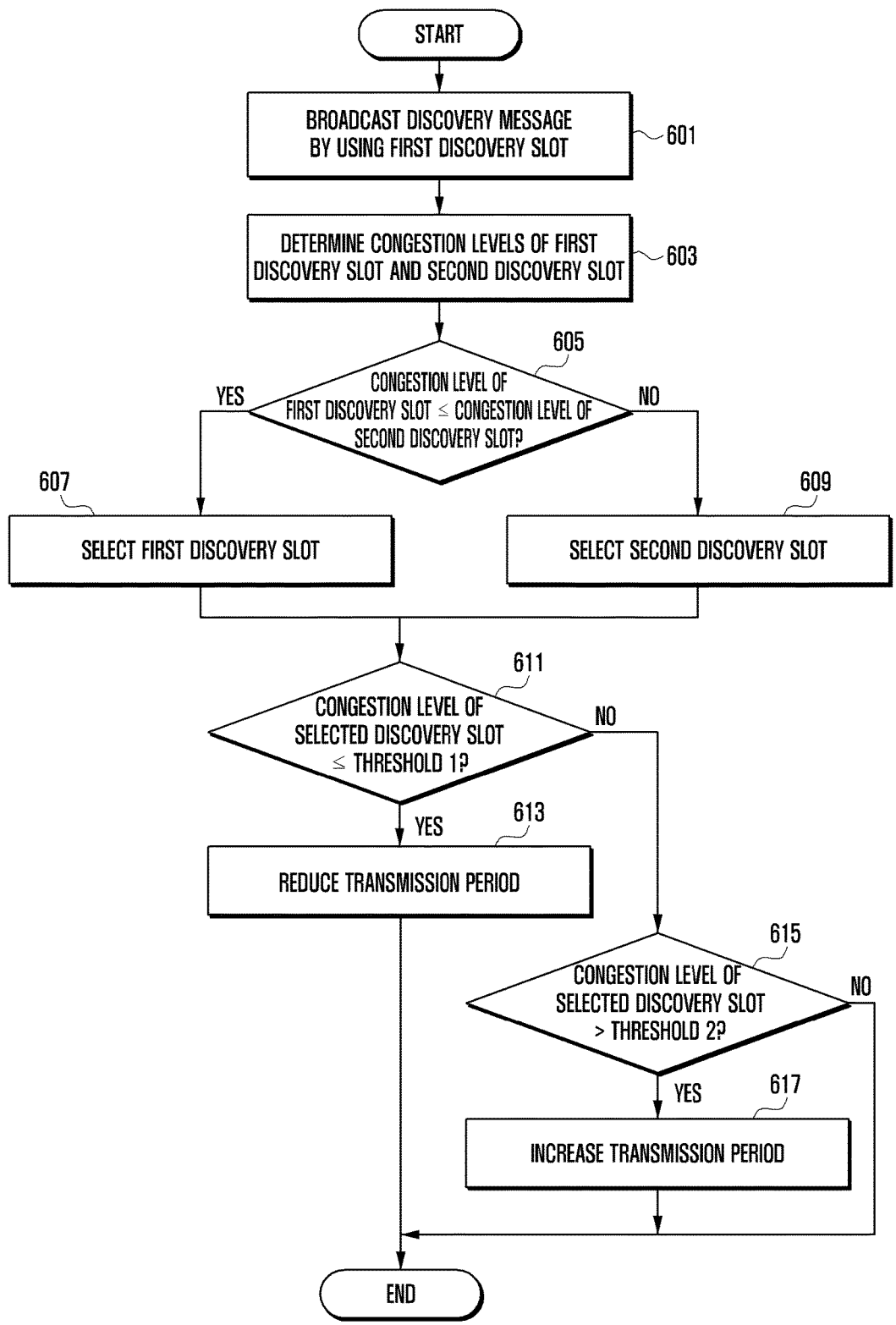
FIG. 10 is a flowchart illustrating a method of performing the discovery according to a fifth embodiment of the present disclosure.

FIG. 10 is a flowchart illustrating a method of performing the discovery according to a fifth embodiment of the present disclosure.

Referring to FIG. 10, the terminal broadcasts a discovery message by using a first discovery slot in step 601.

Next, the terminal determines congestion levels of the first discovery slot and the second discovery slot in step 603.

The terminal observes congestion levels of the discovery resources. The second discovery slot is selected by the terminal randomly or according to a preset condition, and may be selected from a plurality of discovery slots existing in the same discovery resources as those of the first discovery slot. That is, the second discovery slot is selected in the transmission resources including the first discovery slot.

When the second discovery slot is selected, the terminal determines congestion levels of the first discovery slot and the second discovery slot. As a reference for determining the congestion level, a result of measurement of an energy strength (received signal strength), a Bit Error Rate (BER), or the like may be used.

When the congestion levels of the first discovery slot and the second discovery slot are determined, the terminal compares the congestion levels of the first discovery slot and the second discovery slot. More specifically, the terminal determines whether the congestion level of the first discovery slot is equal to or smaller than the congestion level of the second discovery slot in step 605.

When the congestion level of the first discovery slot is equal to or smaller than the congestion level of the second discovery slot, the terminal selects the first discovery slot as the discovery slot to transmit the discovery message in step 607. In contrast, when the congestion level of the first discovery slot is larger than the congestion level of the second discovery slot, the terminal selects the second discovery slot as the discovery slot to transmit the discovery message in step 609.

Thereafter, the terminal may control the transmission period of the discovery message based on a preset minimum threshold and a maximum threshold.

More specifically, the terminal determines whether the congestion level of the selected discovery slot is equal to or smaller than a first threshold in step 611.

The first threshold is the minimum threshold and may be preset by a network, a D2D service provider, or a user. The minimum threshold may refer to a minimum congestion level required when the terminal broadcasts the discovery message by using the corresponding discovery slot. That is, when the congestion level of the predetermined discovery slot is smaller than the minimum threshold, a collision may not occur when the discovery message is transmitted through the corresponding discovery slot or the discovery message may be correctly transmitted to an adjacent terminal.

When the congestion level of the selected discovery slot is equal to or smaller than the first threshold, the terminal reduces the transmission period in step 613.

That is, when the congestion level of the selected discovery slot is equal to or smaller than the first threshold, it means that a channel state of the currently selected discovery slot is good, so that the terminal reduces the transmission period and more frequently broadcasts the discovery message.

In contrast, when the congestion level of the selected discovery slot is not equal to or not smaller than the first threshold, the terminal determines whether the congestion level of the selected discovery slot is larger than a second threshold in step 615.

The second threshold is the maximum threshold and may be preset by a network, a D2D service provider, or a user. The maximum threshold may refer to a maximum congestion level that allows the terminal to broadcast the discovery message by using the corresponding discovery slot. That is, when the congestion level of the predetermined discovery slot is larger than the maximum threshold, a serious collision may occur when the discovery message is transmitted through the corresponding discovery slot or a loss of the message is large, so that the terminal may not correctly transmit the discovery message.

When the congestion level of the selected discovery slot is larger than the second threshold, the terminal increases the transmission period in step 617.

That is, when the congestion level of the selected discovery slot is larger than the second threshold, it means that a channel state of the currently selected discovery slot is bad, so that the terminal increases the transmission period and mitigates a lack of transmission resources due to the discovery message.

Figure 11:
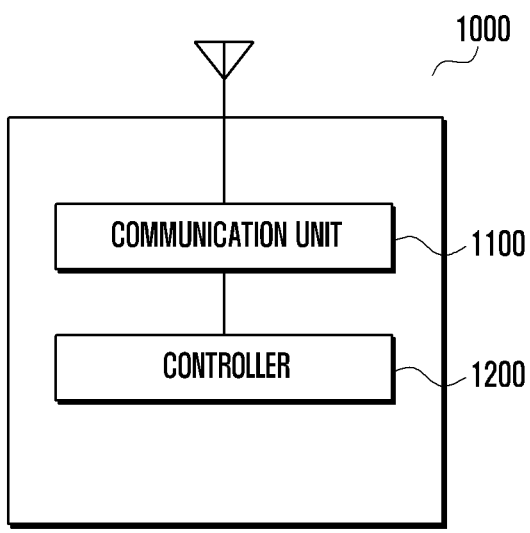
FIG. 11 is a block diagram illustrating a configuration of a terminal using a method of performing the discovery according to the present invention.

FIG. 11 is a block diagram illustrating a configuration of a terminal using a discovery performing method according to the present invention.

Referring to FIG. 11, a terminal 1000 according to the present invention may include a communication unit 1100 and a controller 1200.

The communication unit 1100 performs data communication with another terminal supporting D2D communication according to a control of the controller 1200. The communication unit 110 may broadcast a discovery message for discovering an adjacent terminal or exchange actual data with the adjacent terminal found through the discovery message.

The controller 1200 controls elements of the terminal 1000 including the communication unit 1100 in order to perform the D2D communication.

According to an embodiment of the present invention, the controller 1200 compares a congestion level of a currently used discovery slot and a congestion level of another discovery slot selected randomly or according to a preset condition and determines a time slot to transmit the discovery message based on a result of the comparison between the congestion levels. Further, the controller 1200 may determine a transmission period of the discovery message based on the result of the comparison between the congestion levels.

It will be understood by those skilled in the art to which the present invention belongs that the present invention may be changed and modified without departing from the scope and the spirit of the present invention. Accordingly, the embodiments disclosed in the present invention are only for describing, but not limiting, the technical idea of the present invention, and the scope of the technical idea of the present invention is not limited by the embodiments. The scope of the present invention shall be construed on the basis of the accompanying claims in such a manner that all of the technical ideas included within the scope equivalent to the claims belong to the present invention.

The invention claimed is:

1. A method of performing a D2D discovery using discovery resources including a plurality of discovery slots, the method comprising: broadcasting a first discovery message by using a first discovery slot in a discovery resource; comparing a congestion level of a second discovery slot in the discovery resource with a predetermined congestion level; determining one of the first and the second discovery slots to broadcast a second discovery message and a transmission period of the second discovery message based on a result of the comparison; and broadcasting the second discovery message by using the determined discovery slot and the determined transmission period.

2. The method of claim 1, wherein the predetermined congestion level is one of a congestion level of the first discovery slot, a preset threshold, a minimum congestion level, and a maximum congestion level.

3. The method of claim 1, wherein the determining of the discovery slot to broadcast the second discovery message comprises:
when a congestion level of the first discovery slot is larger than a congestion level of the second discovery slot, determining the second discovery slot as the discovery slot to broadcast the second discovery message; and when the congestion level of the first discovery slot is smaller than the congestion level of the second discovery slot, determining the first discovery slot as the discovery slot to broadcast the second discovery message.

4. The method of claim 1, wherein the determining of the discovery slot to broadcast the second discovery message comprises, when a congestion level of the second discovery slot is smaller than a preset threshold, determining the second discovery slot as the discovery slot to broadcast the second discovery message.

5. The method of claim 1, wherein the determining of the discovery slot to broadcast the second discovery message comprises, when a congestion level of the first discovery slot is smaller than a congestion level of the second discovery slot and when the congestion level of the first discovery slot is larger than a preset threshold, determining a randomly selected third discovery slot as the discovery slot to broadcast the second discovery message.

6. The method of claim 1, wherein the determining of the transmission period comprises:
when a congestion level of the first discovery slot is larger than a congestion level of the second discovery slot, reducing the transmission period; and
when the congestion level of the first discovery slot is equal to or smaller than the congestion level of the second discovery slot, increasing the transmission period.

7. The method of claim 1, wherein the determining of the transmission period comprises:
when a congestion level of the second discovery slot is equal to or smaller than a preset threshold, reducing the transmission period; and
when the congestion level of the second discovery slot is larger than the preset threshold, increasing the transmission period.

8. The method of claim 1, wherein the determining of the transmission period comprises:
when a congestion level of the determined discovery slot to broadcast the second discovery message is smaller than a preset minimum threshold, reducing the transmission period; and
when the congestion level of the determined discovery slot to broadcast the second discovery message is larger than a preset maximum threshold, increasing the transmission period.

9. The method of claim 1, wherein the second discovery slot is selected within the discovery resource including the first discovery slot randomly or according to a preset condition, and the preset condition includes at least one of congestion levels, received signal strengths, pre-selection frequencies, and predefined selection patterns of the plurality of slots.

10. The method of claim 1, wherein the discovery resource is radio resources allocated by a network to allow one or more terminals to broadcast discovery messages.

11. A terminal for performing a D2D discovery using discovery resources including a plurality of discovery slots, the terminal comprising: a transceiver configured to broadcast a discovery message; and a controller configured to control the transceiver to broadcast a first discovery message by using a first discovery slot in a discovery resource, to compare a congestion level of a selected second discovery slot in the discovery resource with a predetermined congestion level, to determine one of the first and the second discovery slots to broadcast the a second discovery message and a transmission period of the second discovery message based on a result of the comparison, and to control the transceiver to broadcast the second discovery message by using the determined discovery slot and the determined transmission period.

12. The terminal of claim 11, wherein the predetermined congestion level is one of a congestion level of the first discovery slot, a preset threshold, a minimum congestion level, and a maximum congestion level.

13. The terminal of claim 11, wherein the controller determines the second discovery slot as the second discovery slot to broadcast the discovery message when a congestion level of the first discovery slot is larger than a congestion level of the second discovery slot, and determines the first discovery slot as the discovery slot to broadcast the second discovery message when the congestion level of the first discovery slot is smaller than the congestion level of the second discovery slot.

14. The terminal of claim 11, wherein the controller determines the second discovery slot as the discovery slot to broadcast the second discovery message when a congestion level of the second discovery slot is smaller than a preset threshold.

15. The terminal of claim 11, wherein the controller determines a randomly selected third discovery slot as the discovery slot to broadcast the second discovery message when a congestion level of the first discovery slot is smaller than a congestion level of the second discovery slot and when the congestion level of the first discovery slot is larger than a preset threshold.

16. The terminal of claim 11, wherein the controller reduces the transmission period when a congestion level of the first discovery slot is larger than a congestion level of the second discovery slot, and increases the transmission period when the congestion level of the first discovery slot is equal to or smaller than the congestion level of the second discovery slot.

17. The terminal of claim 11, wherein the controller reduces the transmission period when a congestion level of the second discovery slot is equal to or smaller than a preset threshold, and increases the transmission period when the congestion level of the second discovery slot is larger than the preset threshold.

18. The terminal of claim 11, wherein the controller reduces the transmission period when a congestion level of the determined discovery slot to broadcast the second discovery message is smaller than a preset minimum threshold, and increases the transmission period when the congestion level of the determined discovery slot to broadcast the second discovery message is larger than a preset maximum threshold.

19. The terminal of claim 11, wherein the second discovery slot is selected with the discovery resource including the first discovery slot randomly or according to a preset condition, and the preset condition includes at least one of congestion levels, received signal strengths, pre-selection frequencies, and predefined selection patterns of the plurality of slots.

20. The terminal of claim 11, wherein the discovery resource is radio resources allocated by a network to allow one or more terminals to broadcast discovery messages.

* * * * *